Feb. 28, 1950     W. H. MULLINS ET AL     2,499,276
PARKING BRAKE CONTROLLED IGNITION AND LIGHT
SWITCH, AND GEAR SHIFT LEVER LOCK
Filed Nov. 1, 1945     3 Sheets—Sheet 1
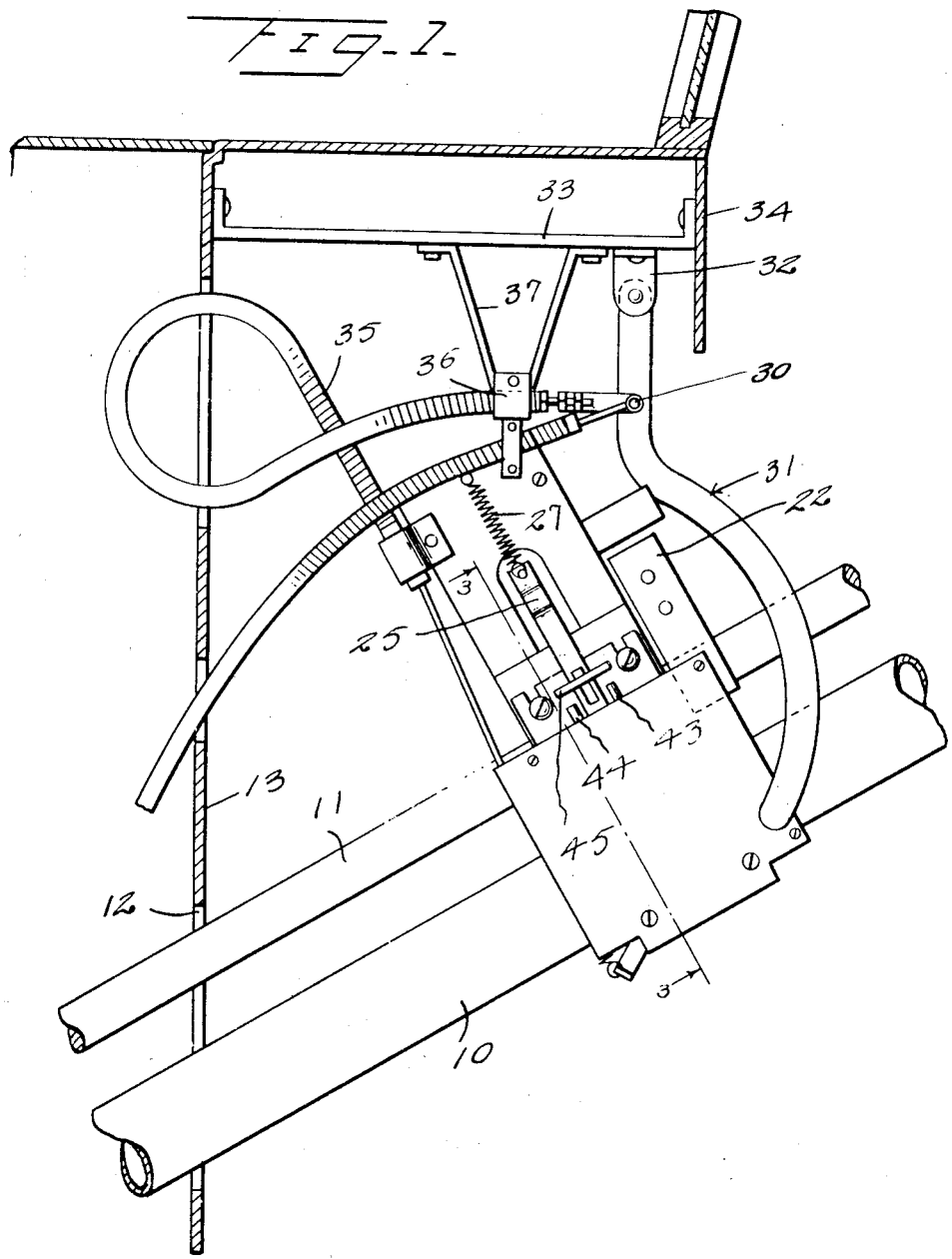
Inventor
W. H. Mullins
W. M. Gentry
By Kimmel & Crowell Attorneys

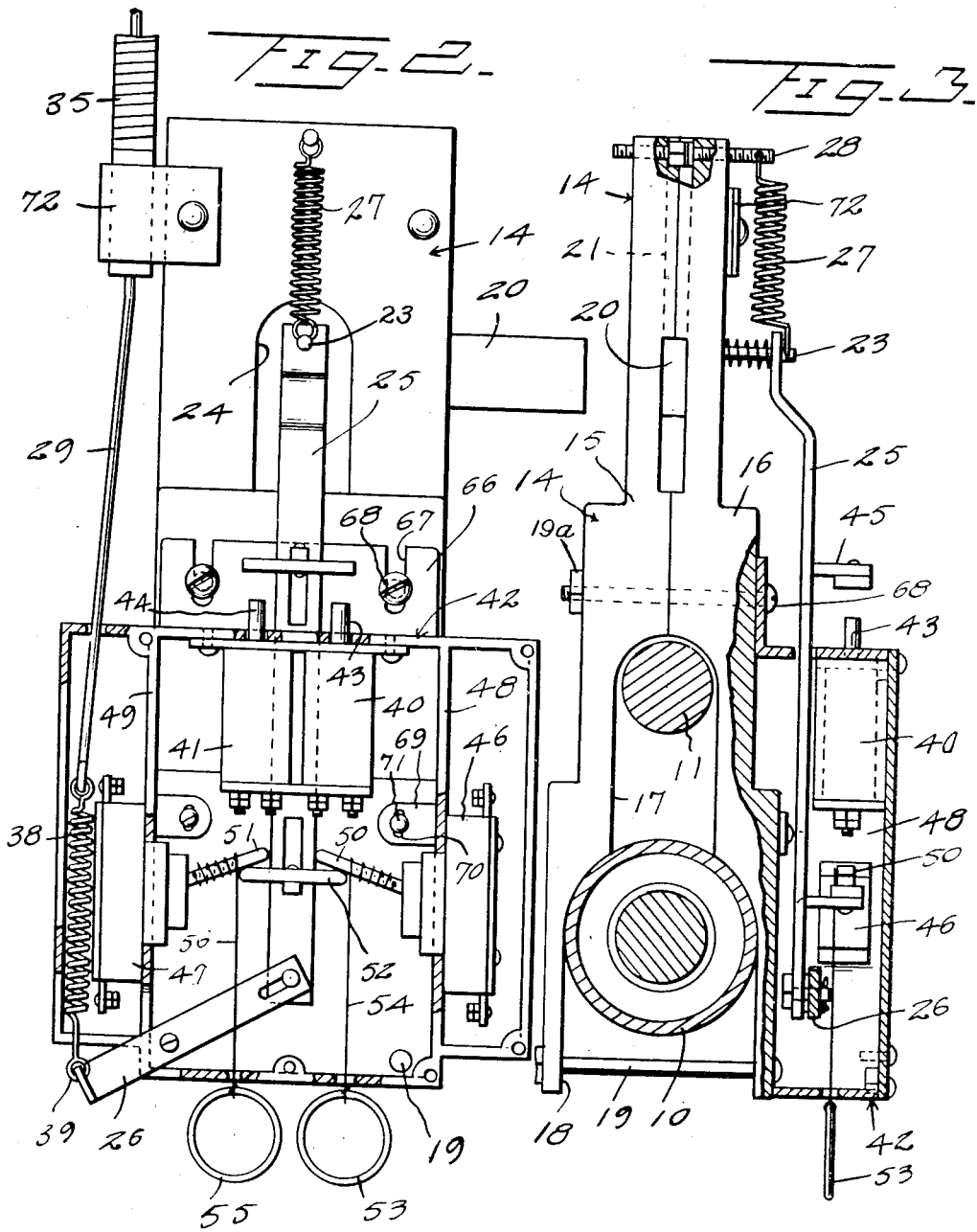

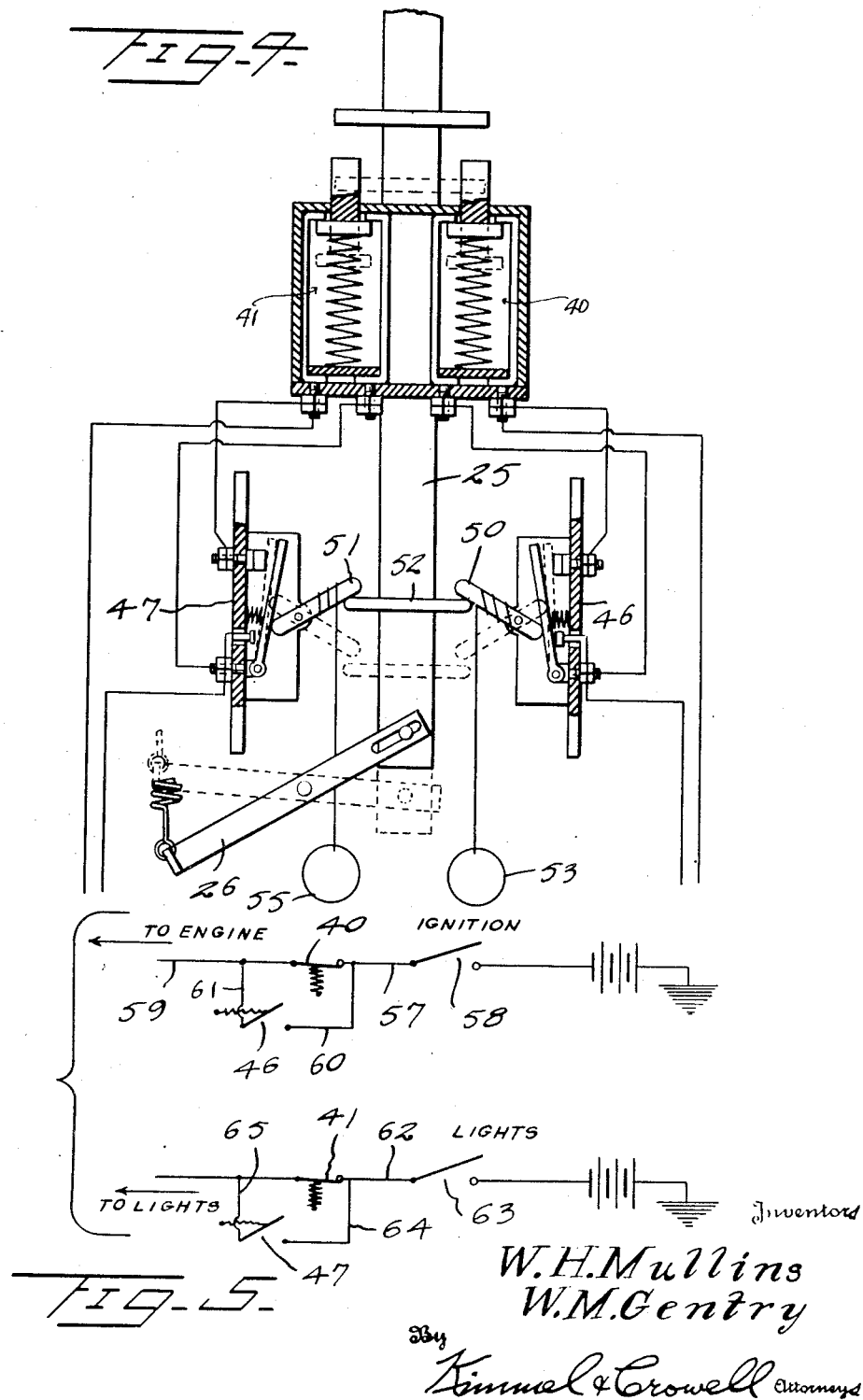

Patented Feb. 28, 1950

2,499,276

UNITED STATES PATENT OFFICE 2,499,276

PARKING BRAKE CONTROLLED IGNITION AND LIGHT SWITCH, AND GEARSHIFT LEVER LOCK

William H. Mullins and William M. Gentry, South Boston, Va.

Application November 1, 1945, Serial No. 626,084

6 Claims. (Cl. 192—3)

This invention relates to motor vehicles and more particularly to safety switches for the ignition and lighting circuits of the vehicle.

An object of this invention is to provide switches interposed in the ignition and lighting circuits which are spring-pressed to circuit closing position and are moved to circuit breaking position when the emergency or parking brake is in braking position.

Another object of this invention is to provide a pair of switches interposed in the ignition and lighting circuits which are spring-pressed to circuit closing position and which are moved to circuit breaking position upon movement of the emergency or parking brake to braking position, and to also provide a pair of shunt switches of the snap or toggle type which are shunted across the ignition and lighting switches, the shunt switches being manually moved to circuit closing position and being moved to circuit breaking position when the emergency brake lever is moved to released position.

A further object of this invention is to provide a safety means of this kind which is combined with and operated by the gear shift lock embodied in our copending application, Serial No. 598,306, filed June 8, 1945, for Gear shift locking device, now Patent No. 2,411,455, dated Nov. 19, 1946.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail side elevation of a device constructed according to an embodiment of this invention mounted on the steering column of a vehicle, the vehicle being shown partly broken away and in section, Figure 2 is an enlarged side elevation partly in section of the device with the housing cover removed, Figure 3 is a sectional view taken substantially on the line 3—3 of Figure 1, Figure 4 is a diagrammatic view showing the electric circuits embodied in this invention, and Figure 5 is a schematic view of the electric circuits.

Referring to the drawings, the numeral 10 designates the steering column of a vehicle and the numeral 11 designates a gear shifter rod disposed on the upper side of the steering column 10. The steering column 10 and the gear shifter member 11 extend downwardly through an opening 12 formed in the rear wall 13 of the engine compartment.

A housing, generally designated as 14, is clamped onto the steering column 10 and includes complementary housing members 15 and 16 which are formed with a slot or opening 17 within which the gear shifter member 11 is adapted to loosely engage and is also formed with a counterslot 18 within which the steering column 10 is adapted to engage and the two housing members 15 and 16 are tightly clamped on the steering column 10 by means of fastening members 19. The housing members 15 and 16 are clamped together above the gear shifter member 11 by means of a pair of fastening members 19a. A slide 21 engages in the confronting sides of the housing members 15 and 16 and is formed with a gear shift locking bolt 20 extending from the housing members 15 and 16.

A keeper 22 is fixedly secured to the gear shifter rod 11 and disposed in a position whereby the keeper member 22 is adapted to engage the bolt 20 when the latter is moved inwardly toward the gear shifter member 11, as will be hereinafter described. The slide 21 has extending laterally therefrom a bolt 23 which extends through an opening 24 formed in the housing member 16. An elongated bar 25 is mounted on the bolt 23 and extends downwardly and is pivotally connected to a rock lever 26 which is secured to the lower portion of the housing member 16. A spring 27 is connected at one end to the bolt 23 and at the other end to a stationary bolt 28 secured to and extending laterally from the upper end portion of the housing 14. The bar 25 and the slide 21 are moved downwardly so as to position the bolt 20 in the path of the keeper 22 by means of a flexible lever operator 29, which is connected at one end, as at 30, to the emergency or parking brake lever 31. The brake lever is 31 is rockably carried by a bearing 32, which is secured to a supporting bar 33 extending between the wall 13 and the dash board 34. The flexible member 29 is slidably mounted in a sheath 35, which is fixedly clamped by a clamping member 36 to a bracket 37 dependingly secured to the supporting bar 33. The lower end of the flexible member 29 is connected to a spring 38 and the latter is connected, as at 39, to the extended end of the rock lever 26. In this manner when the brake lever 31 is pulled inwardly with respect to the vehicle body to a braking position, the flexible member 29 will be pulled upwardly and rocking lever 26 will pull the slide member 21 downwardly so that the bolt 20 will be disposed in the path of the swinging movement of the keeper 22.

In order to provide a means whereby the lighting and ignition circuits of the vehicle will be cut off at the time the brake lever 31 is moved to a braking position, I have provided a pair of switches 40 and 41 which are spring pressed to a normal circuit closing position. The switches 40 and 41 are secured to the top wall of a switch housing, generally designated as 42, and each includes a button or operator 43 and 44 respectively, projecting upwardly through the top wall of the housing 42. The bar 25 has extending therefrom a switch operator 45 disposed in the path of the buttons 43 and 44 so that when the bar 25 is pulled downwardly with the brake lever 31 in braking position, the operator 45 will push the buttons 43 and 44 inwardly to a circuit breaking position and thereby break the electric circuits to both the ignition and lighting circuits of the vehicle.

In order to provide a means whereby the ignition or lighting circuits may be selectively closed at the time the switches 40 and 41 are in circuit breaking position, I have provided shunt switches 46 and 47 which are secured to inner walls 48 and 49 respectively of the housing 42. The switches 46 and 47 are below the switches 40 and 41 and each includes an operating lever 50 and 51 respectively extending inwardly. The switches 46 and 47 are of the snap or toggle type which are adapted to remain in either circuit closing or circuit breaking position depending on the position of the operating lever therefor. In the present instance the operating levers 50 and 51 are disposed in confronting position and normally are inclined upwardly and inwardly, as shown in Figure 2. An operator 52 is carried by the bar 25 and is normally disposed below the levers 50 and 51 and will normally move with the bar 25 without movement of the levers 50 and 51. With the bar 25 downwardly and the switches 40 and 41 in circuit breaking position, the ignition circuit may be closed by moving the switch 46 to an open position. This is accomplished by pulling downwardly on a ring 53, which is connected by means of a connecting member 54 to the operator 50 of the switch 46.

The lighting circuit may also be closed when the switch 41 is in circuit breaking position by downward pull on a ring 55 connected to the lever or operator 51 by a connecting member 56. When the operating members 50 and 51 are pulled downwardly to a circuit closing position, as shown in dotted lines in Figure 4, when the brake lever 31 is moved to a released position the bar 25 will move upwardly and operator 52 will engage the levers 50 and 51, so as to move these levers upwardly or inwardly of the housing 42 to a circuit breaking position with respect to the switches 46 and 47.

Referring now to the schematic diagram in Figure 5, the switch 40 is interposed in the ignition circuit being connected by conductor 57 to the ignition switch 58 and connected by a conductor 59 to the tension coil normally connected with the ignition switch 58. The shunt switch 46 is connected across the switch 40 by means of conductors 60 and 61. The switch 41 is interposed in the lighting circuit being connected by means of a conductor 62 to the lighting switch 63. The shunt switch 47 is connected across the switch 41 by conductors 64 and 65.

The housing 42 is fixedly secured to the housing 41 being provided at its upper end with a flange 66 having a pair of notches 67 therein through which fastening members 68 engage so that the housing 42 may be lengthwise adjusted with respect to the housing 14. A pair of inwardly projecting ears 69 are carried by the walls 48 and 49 and are formed with elongated slots 70 through which fastening members 71 engage.

In the use and operation of this device the sheath 35 is anchored at one end by the clamping member 36 carried by the bracket 37 and the opposite end of the sheath 35 is clamped to the upper portion of the housing 14 by means of a clamp 72. When the brake lever 31 is in released position the bar 25 will be in an uppermost position as shown in Figures 2 and 3. The switches 40 and 41 will be in circuit closing position so that the ignition circuit may be closed by means of the normal ignition switch and the lighting circuits may be closed by the normal lighting switch. When the vehicle is stopped and the emergency or parking brake lever 31 is pulled to a braking position by rocking of this lever to the right, as viewed in Figure 1, lever 26 will be rocked to pull the bar 25 downwardly and switch operator 45 will thereupon strike the buttons 43 and 44 so that the switches 40 and 41 will be in a circuit breaking position. The shunt switches 46 and 47 will normally be in a circuit breaking position with the operators 50 and 51 inclined upwardly and inwardly as shown in Figure 2.

In the event it is desired to operate the engine and to turn on the lights with the brake lever 31 in braking position, the switch operating members 53 and 55 may be pulled downwardly so that the switches 46 and 47 will be in a circuit closing position. The usual ignition and lighting switches may then be moved to a circuit closing position. With the switches 46 and 47 in circuit closing position when the brake lever 46 is moved to a released position the operator 52 will move the switch levers 50 and 51 upwardly to circuit breaking position while the buttons 43 and 44 are released so that the switches 40 and 41 will simultaneously be moved to a circuit closing position. In this manner there will not be any lag in time between the breaking of the circuits through movement of switches 40 and 46 and the closing of the circuits by release of operators 43 and 44 of switches 40 and 41.

The exact configuration illustrated is regarded as the optimum but some of the desirable results inherent in this disclosure may be obtained by various slight modifications including some departure from the exact configuration shown, and it is, therefore, requested that the scope of the invention should be regarded as limited only by the terms of the claims.

What we claim is:

1. The combination with an emergency brake lever, and the ignition and lighting circuits of a vehicle, of a pair of switches interposed one each in said circuits, means biasing said switches to circuit closing position, a slide member, means supporting said slide member, means connecting said slide member with said brake lever, and means operatively connected to said slide member engageable with said switches whereby movement of said lever to braking position with movement of said slide member will move said switches to circuit breaking position.

2. The combination set forth in claim 1 including a spring constantly urging said slide member away from said switches.

3. The combination as set forth in claim 1 including a manually operable shunt switch across each of said first switches.

4. The combination as set forth in claim 1 including a snap switch shunted across each of said first switches, and means operatively connected to said slide member engageable with said snap switches for moving the latter to circuit breaking position when said lever is moved to released position.

5. The combination with an emergency brake lever, and the ignition and lighting circuits of a vehicle, of a pair of switches interposed one each in said circuits, means biasing said switches to circuit closing position, means connected to said brake lever for operation thereby and correlated with said switches for moving the latter to circuit breaking position when said lever is in braking position, and a pair of manually operable switches shunted across said first switches.

6. In combination with a movable hand brake operator, a steering column, a rockable gear shift operator parallel to said column, and the ignition and lighting circuits of a vehicle; a switch interposed in each of said circuits and normally biased to circuit closing position, a keeper fixed on said gear shift operator, a slide member, means slidably supporting said slide member on said steering column, means connecting said slide member to said brake operator, a locking bolt carried by said slide member and adapted to engage said keeper for preventing rocking of said gear shift operator in one position of said slide member, and means operatively connected to said slide member and adapted to engage said switches in said one position of said slide member for moving said switches to circuit breaking position.

WILLIAM H. MULLINS.
WILLIAM M. GENTRY.

REFERENCES CITED

The following references are of record in the file of this patent:

UNITED STATES PATENTS

| Number | Name | Date |
| --- | --- | --- |
| 1,519,213 | Moore | Dec. 16, 1924 |
| 1,586,192 | Fuge | May 25, 1926 |
| 1,660,419 | Fazekas | Feb. 28, 1928 |
| 2,411,455 | Mullins | Nov. 19, 1946 |